United States Patent [19]

Grallert

[11] Patent Number: 5,151,902
[45] Date of Patent: Sep. 29, 1992

[54] METHOD AND APPARATUS FOR QUALITY MONITORING OF AT LEAST TWO TRANSMISSION SECTIONS OF A DIGITAL SIGNAL TRANSMISSION LINK

[75] Inventor: Hans-Joachim Grallert, Groebenzell, Fed. Rep. of Germany

[73] Assignee: Siemens Aktiengesellschaft, Munich, Fed. Rep. of Germany

[21] Appl. No.: 497,324

[22] Filed: Mar. 22, 1990

[30] Foreign Application Priority Data

Mar. 22, 1989 [EP] European Pat. Off. ........ 89105172.4

[51] Int. Cl.5 ............................................. G06F 11/00
[52] U.S. Cl. ...................................... 371/51; 371/20.1
[58] Field of Search ................................. 371/5.1, 20.1

[56] References Cited

U.S. PATENT DOCUMENTS

| | | | |
|---|---|---|---|
| 3,315,228 | 8/1963 | Futerfas et al. | 371/20.1 |
| 3,562,710 | 2/1971 | Halleck | 371/5.1 |
| 3,665,394 | 5/1972 | Lender et al. | 371/5.1 |
| 3,916,379 | 10/1975 | Dulaney et al. | 371/5.1 |
| 4,321,666 | 3/1982 | Tasar et al. | 364/200 |
| 4,342,083 | 7/1982 | Freedman et al. | 364/200 |
| 4,356,546 | 10/1982 | Whiteside et al. | 364/200 |
| 4,551,842 | 11/1985 | Segarra | 371/5.1 |

FOREIGN PATENT DOCUMENTS

WO85/00945 2/1985 PCT Int'l Appl. .
1401261 7/1975 United Kingdom .

OTHER PUBLICATIONS

CCITT-recommendations G707-G709, 1988.
Telcom report, special. vol. 10, Dec. 1987, Multiplexing Line Transmission, pp. 107-112.

*Primary Examiner*—Jerry Smith
*Assistant Examiner*—Phung My Chung
*Attorney, Agent, or Firm*—Hill, Van Santen, Steadman & Simpson

[57] ABSTRACT

Method for quality monitoring of at least two series connected transmission sections in a digital signal transmission link for digital equipment conforming to the synchronous digital hierarchy. Error message bytes in which parity errors are accumulated are transmitted in the section overhead of synchronous transport modules as special bytes for the accumulation of parity errors in successive transmission sections. A quality criterion for the monitored transmission link is acquired from a sequence of error message bytes. The method and the apparatus are advantageously used in transmission equipment of digital synchronous hierarchy.

7 Claims, 2 Drawing Sheets

FIG 2A
| Byte 1 | Byte 2 | Byte 3 |
|---|---|---|
| 1 0 0 1 0 0 0 1 | 0 0 0 0 0 0 0 0 | 1 1 1 0 0 1 0 0 |
Bit 1 ... 8  1 ... 8  1 ... 8
PFM (1)
FIG 2B
| Byte 1 | Byte 2 | Byte 3 |
|---|---|---|
| 0 0 0 1 0 0 0 0 | 1 0 0 0 0 0 0 0 | 1 0 1 0 0 0 0 0 |
Bit 1 ... 8  1 ... 8  1 ... 8
PFM (2)
FIG 2C
| Byte 1 | Byte 2 | Byte 3 |
|---|---|---|
| 1 0 0 0 0 0 0 1 | 1 0 0 0 0 0 0 0 | 0 1 0 0 0 1 0 0 |
Bit 1 ... 8  1 ... 8  1 ... 8
PFM (1,2)
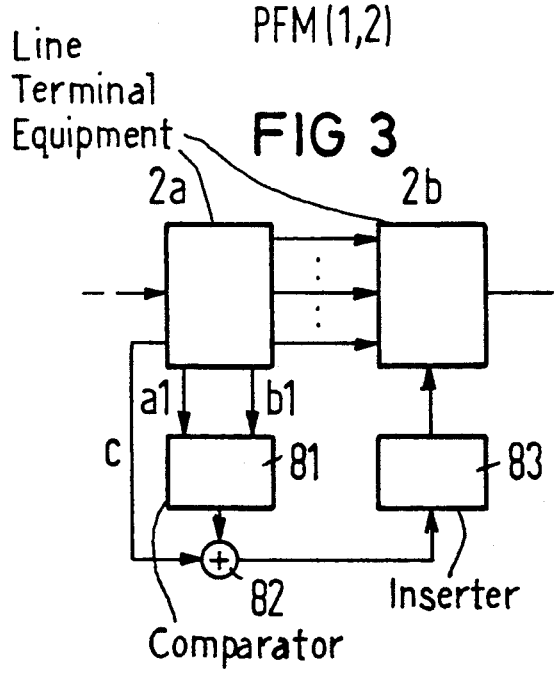
FIG 3
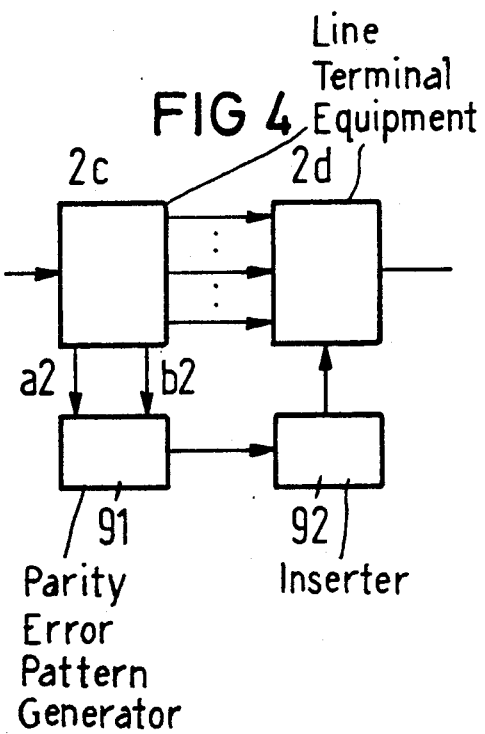
FIG 4

METHOD AND APPARATUS FOR QUALITY MONITORING OF AT LEAST TWO TRANSMISSION SECTIONS OF A DIGITAL SIGNAL TRANSMISSION LINK

BACKGROUND OF THE INVENTION

The present invention is directed to a method and apparatus for quality monitoring of at least two series connected transmission sections of a digital signal transmission link for transmission equipment conforming to a synchronous hierarchy, whereby digital signals are transmitted in virtual containers of synchronous transport modules and section overheads of the synchronous transport of the transmission link having parity bytes and a special byte reserved for special use. The parity bytes are derived from the received digital signals at the respective end of the transmission sections and are compared to the received parity bytes and an error signal is formed in a prescribed dependency on the result of this comparison.

A method of the type initially cited is known from CCITT-recommendations G707 through G709 (hereby incorporated by reference) and from the German periodical NTZ, Vol. 41 (1988) No. 10, Pages 570–574. In the prior art method, bytestructured PCM signals are transmitted together with a parity byte. The parity bytes serve the purpose of calculating the bit error rate during the transmission. In the control case, the parity is formed from the bits of an entire frame or of a sub-frame and these bits are then transmitted in the following frame or sub-frame. The parity byte B1 is checked by every intermediate regenerator and is reformed. Errors in a transmission link can thereby be restricted to the affected regenerator section. By contrast, the parity byte B2 serves the purpose of bit error acquisition of a transmission link between two line ends. The parity byte B3 is provided in the path overhead POH of each and every virtual container and is therefore not available for a quality monitoring of parts of the physical network.

Since the parity byte B1 is respectively reformed at the beginning of the regenerator section and the parity byte B2 is respectively reformed at the start of the transmission link, the regenerator sections or transmission links can be individually monitored. As a result errors in a transmission link can be limited to the affected regenerator section or errors on a transmission path can be limited to the affected transmission link.

Furthermore, Telcom report, special, Vol. 10, December 1987, Multiplexing Line Transmission, Pages 107–112 discloses that digital transmission systems be provided with a means for on-line monitoring. In these systems the intermediate regenerators thereby each contain a monitoring circuit that monitors transgressions of the code rule via the ongoing digital sum. Apart from error bursts, conclusions about the bit error frequency can thus be made at the appertaining location. What is referred to as the error rate is transmitted to the locating apparatus in coded form. The bit error rate at each and every individual intermediate regenerator is thus acquired in the locating apparatus. Conclusions about the transmission quality of the individual regenerator fields can be made in this manner in a monitoring terminal station by a comparison of the measured bit error rates, so that an individual monitoring of transmission sections is also possible.

According to the CCITT recommendations G707 . . . 709, particularly pages 83–84, Chapter 5.21 and Page 93, FIG. 5.1, the parity bytes B1 and B2 are available for quality monitoring in the section overhead SOH, namely one parity byte B1 per synchronous transport module STM-N and one parity byte B2 in every synchronous transport module STM-1. The parity byte B1 allows the monitoring of an individual regenerator section and the parity byte B2 allows the monitoring of a digital signal line section. A through monitoring across a plurality of digital signal line sections is not provided with these two parity bytes according to the CCITT recommendations, since it is not possible for the section overhead SOH to balance frequency differences upon transition from digital signal line section to digital signal line section. It is therefore not possible to produce a fixed linkage of parity bytes in the section overhead SOH to the useful information in the virtual container from the input up to the output of a digital signal line.

SUMMARY OF THE INVENTION

It is an object of the present invention to provide a method that allows parity errors for successive transmission sections to accumulate given transmission equipment having successive transmission sections wherein a fixed linkage of parity bytes in the section overhead to the useful information in the virtual container is not possible from the input to the output of a transmission link. It is a further object to provide a practical apparatus for the implementation of such a method.

In a method of the type initially cited, the stated object is inventively achieved by a method having the steps of: deriving an error message byte in at least one intermediate location from the error signal and transmitting the error message byte over the following transmission section as one of the special bytes; deriving a new error message byte from the received error message byte and a locally formed error signal at the end of at least one following transmission section; and acquiring a quality criterion for the monitored transmission link by evaluating a sequence of error message bytes. The transmission sections of the transmission link can be line sections or lines.

An advantage of the present invention is that the transmission quality of a chained circuit of a plurality of transmission sections can be identified by accumulation of the parity errors of successive transmission sections using a means which is not specifically provided for this purpose.

Also in the method, a great plurality of successive error message bytes can be evaluated such that a change of the result of the evaluation produced by the loss or the double reception of special bytes falls below a prescribed level. Further the number of parity errors can be calculated in the acquisition of the error signal, and the number of parity errors derived from the error signal can be added to the number of parity errors contained in the received error message byte in the derivation of the new error message byte. Also, a parity error pattern can be formed in the acquisition of the error signal per transport module, and the locally formed parity error pattern and the received parity error pattern can be combined bit-by-bit in the derivation of the error message byte, being combined by an exclusive OR-function. The error message bytes can be transmitted between synchronous line multiplexers of the respective intermediate location on the same lines as the digital signals.

The apparatus for the implementation of the method has line terminal equipment which have synchronous multiplexers and monitoring circuits and intermediate locations which have synchronous regenerators and monitoring circuits. At least one of the intermediate locations has a means for locally generating comparison signals from the received digital signals, a means for comparing the received parity bytes to the locally generated comparison signals, and a means for deriving the error message signals from the comparison of the received parity bytes and the comparison signals.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 2A, 2B and 2C are diagrams depicting the linkage of two bit error patterns to a third bit error pattern;

FIG. 3 is a block diagram of an intermediate location having an apparatus for the addition of numbers of parity errors; and FIG. 4 is a block diagram of an intermediate location having an apparatus for linking patterns of bit errors.

DESCRIPTION OF THE PREFERRED EMBODIMENTS

Figure 1:
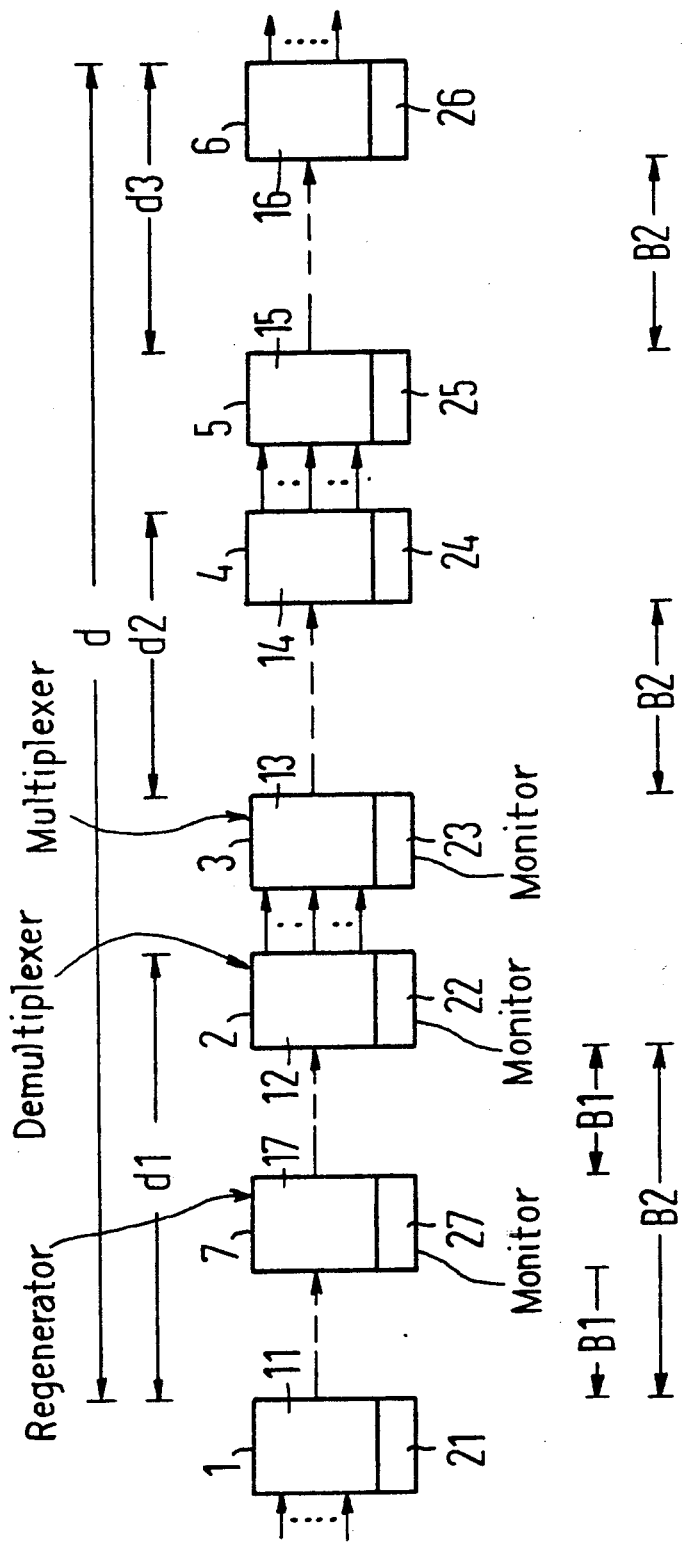
FIG. 1 is a block diagram depicting PCM transmission equipment having three digital signal line sections.

FIG. 1 shows an apparatus for the transmission of digital signals from line terminal equipment 21 to line terminal equipment 26 via the transmission link d.

In addition to multiplexers, 11, 13, 15, and demultiplexers, 12, 14, 16, the line terminal equipment 1-6 contain monitoring circuits 21, 22, 23 . . . 26 for bit error recognition. The intermediate location 7 contains a regenerator 17 and a monitoring circuit 27 for bit error recognition. The monitoring circuits 22 . . . 27 can be connected via a return channel (not shown) to the monitoring circuit 21 of the line terminal equipment 1 that is a component part of a means for on-line monitoring of the transmission equipment.

The transmission link d is composed of the digital signal line sections d1, d2 and d3 that are referred to below as line sections. Parity bytes are transmitted in addition to the digital signals for monitoring these three successive transmission sections d1, d2 and d3. These parity bytes B2 are derived from the respective digital signals at the start of the line sections d1, d2 and d3 and are inserted into the digital signals.

Respective parity bytes are derived from the received digital signals at the end of the line sections d1, d2 and d3. These parity bytes are compared to the received parity bytes. Thus, a comparison is performed between received parity bytes and locally formed parity bytes. Error messages are thereby formed in a prescribed dependency on the comparison result and may be transmitted to the central monitoring circuit 21 via a return channel.

The transmission equipment may be of the type referred to as the synchronous digital hierarchy as known from CCITT recommendations G707 through G709.

The digital transmission link therefore respectively contains synchronous multiplexers 1, 3, 5 at the start of the line sections d1, d2 and d3 and synchronous demultiplexers 2, 4, 6 at the end of the line sections d1, d2, d3 and contains synchronous regenerators such as, for example, the regenerator 7 intermediate in the line d.

The recognition of bit errors in the regenerator sections occurs with the parity bytes B1 that are newly calculated in every regenerator, for example in the regenerator 7, and are introduced into the data stream.

Parity errors that may arise are counted in the monitoring circuits 22 . . 26 and 27, and are compared to thresholds and may then be converted into alarm messages.

Without special measures as set forth below, a monitoring of individual regenerator or line sections is provided in the transmission equipment under consideration, but a monitoring across a plurality of line sections is not provided, since there is no possibility for the section overhead SOH to balance frequency differences upon transition from line section to line section. It is also not possible to produce a fixed linkage of parity bytes in the section overhead to the useful information in the virtual container.

The methods set forth below manage without the linkage and are based on the perception that an error statistic over a comparatively short time span is adequate for quality monitoring of a transmission section, so that the frequency differences do not have a disturbing influence.

In a first method alternative, the number of parity errors ZPF (1) per synchronous transport module STM-1 is calculated at the end of the line section d1 from the parity byte B2, is transported to the input of the line section d2 and is transmitted there in the section overhead SOH of the corresponding standard transport module STM-1. The number of parity errors ZPF (2) is calculated at the end of the line section d2 and the sum of the number ZBF (1) and the number ZPF (2) is available for further transmission.

At the output of the digital signal line, the accumulated parity errors $$ZPF_a = \sum_{i=1}^{n} ZPF(i)$$

from a respective plurality n of series connected line sections are present in every received frame.

The quality of the digital signal line is evaluated on the basis of short-term statistics via a chronological sequence of m accumulated parity error numbers ZPFa(t), that is $$\sum_{t=1}^{m} ZPF_a(t).$$

As a consequence of frequency differences between the line sections d1. . . d3, the number of parity errors $$\sum_{i=1}^{j} ZPF(i)$$

accumulated up to this location can be lost or can be transmitted twice in (relatively rare instances) for the duration of a single frame upon transition from one line section j to the next line section j+1.

Since the evaluation of the transmission quality of the digital signal line in the intended evaluation over a short time span is also based on statistics concerning a relatively great number of frames of standard transport modules STM-1, this has practically no influence on the results of the evaluation.

When a duration of 125 micro seconds is provided in the synchronous digital hierarchy, a plurality of 100 frames is evaluated, and a time span of 12.5 msec results. In particular, the provided evaluation time span is in the range of 10 msec through 15 msec.

A second alternative of the method is based on the concept of generating a parity signal over the entire digital signal line. Two individual parity errors that appear in the same parity track but in different line sections are thereby not recognized. A parity error pattern PFM (1) is identified at the output of the line section d1 from the parity byte B2 per synchronous transport module STM-1. Such a parity error pattern results because (for formal formation of a parity word) the bit block to be acquired is first divided bit-by-bit into sub-blocks and the parity bit is subsequently formed for every bit sub-block. The parity bits calculated in this way then yield the parity word. This method is known by the name of bit-interleaved - parity (BIP).

The parity error pattern PFM (1) is mixed into the section overhead of the corresponding synchronous transport module STM-1 at the input of the line section d2 and is transmitted. A parity error pattern PFM (2) is identified at the end of the line section d2 and is subsequently combined bit-by-bit with the parity error pattern (1) to form the parity error pattern (1, 2), being combined via an exclusive OR-function.

FIGS. 2A, 2B and 2C show such patterns wherein the errors recognized in the individual tracks are each marked by a "1".

The following is achieved on the basis of this operation:

a) the sum of the "1" in the parity error pattern PFM (1, 2) indicates the plurality of recognized parity errors that have accumulated up to the output of the line section d2.

b) two individual parity errors that appear in the same track, but in different line sections are treated like a double error, i.e. they are not expressed in the final result of the evaluation.

The parity error pattern PFM (1, 2) is transmitted via the line sections d3. A parity error pattern PFM (3) is identified in the line terminal equipment 6 and is subsequently combined bit-by-bit with the parity error pattern (1, 2) to form the parity error pattern (1, 2, 3), being operated via an exclusive OR-function. A parity error pattern for the entire digital signal line is thus available at the output of the digital signal line d.

The consequences of frequency differences between neighboring digital signal line sections, stated above for the first alternative method, applies analogously to the second alternative method.

In the first alternative of the method, the accumulation of the parity errors is expediently carried out by a means of a type comprised by the intermediate location shown in FIG. 3. In addition to the line terminal equipment 2a and 2b arranged back-to-back, the intermediate location shown in FIG. 3 also contains a means 81 for calculating the bit error number ZPF (i) of the preceding $i^{th}$ line section, an adder 82 and a means 83 for mixing. Proceeding from the line terminal equipment 2a, the parity bytes received by the line terminal equipment 2a are supplied to the means 81 via the connection a1 and the parity bytes calculated from the digital signal are supplied thereto via the connection b1. These bytes are compared to one another in the means 81. The number of parity errors ZPF (i) of the $i^{th}$ line section thereby acquired is added in the adder 82 to the number CPF (1 ... i−1) arriving via the connection c, i.e. to the sum of bit error numbers from the line sections that precede the last line section. The sum formed in this fashion is supplied to the means 83 for mixing into the bit stream emanating from the line terminal equipment 2b. Special bytes of the section overheads of the synchronous transport modules that are reserved for special use according to the CCITT recommendations thereby serve for the transmission of the sum.

The accumulated parity errors are available at the output of the adder 82 at the end of the digital signal line and therefore the means 83 is omitted in this last stage.

In the second modification of the method, the accumulation of the parity errors is expediently carried out with a means comprised by the intermediate location shown in FIG. 4.

In addition to the line terminal equipment 2c and 2d arranged back-to-back, the intermediate location shown in FIG. 4 also contains a means 91 for forming parity error patterns and contains a means 91 for mixing the bit error pattern into the bit stream emanating from the line terminal equipment 2d. From the first bit pattern received via the line a2 and from the second bit pattern received via the line b2, the means 91 forms a third bit error pattern in the same manner as described in reference to FIG. 2. This bit error pattern is inserted into the bit stream leaving the line terminal equipment 2d using the means 92. The accumulated parity errors at the output of the means 91 are available at the output of the digital signal line as parity error pattern and therefore the means 92 is omitted in this last stage.

An especially simple realization of the accumulation of bit error numbers provided in the method derives when the parity error numbers $PFZ_a$ (i) or, respectively, the parity error patterns PFM (1, 2 ... j) are transmitted between the synchronous line multiplexers of the respective intermediate location on the same lines as the digital signals.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for quality monitoring of at least two series connected line sections of a digital signal transmission link having transmission equipment operating according to a synchronous hierarchy, wherein digital signals are transmitted in virtual containers of synchronous transport modules and section overhead of synchronous transport modules and having module parity bytes and a special parity byte in a path overhead of each virtual container, for each line section module parity bytes derived from digital signals received at an end of the respective line section being compared to received module parity bytes received at a start of the respective line section and an error signal being formed in a prescribed dependency on a result of the comparison, comprising the steps of:

deriving an error message byte, in at least one intermediate link location of the transmission link at which an end of one line section is connected to a start of a following line section, from the error signal and transmitting the error message byte over the following line section as the special parity byte, and the error message byte being transmitted on lines that carry the digital signals between synchronous line multiplexers of the at least one intermediate link location; deriving in the following line section, a new error message byte from the error message byte received from the one line section and an error signal formed at the end of the following line section;

repeating the steps of forming an error message byte to produce a sequence of error message bytes of the transmission link and acquiring a quality criterion for the monitored transmission link by evaluating the sequence of error message bytes.

2. The method according to claim 1, wherein a plurality of successive error message bytes in the sequence of error message bytes are evaluated and wherein a change of a result of the evaluation, produced by one of a loss and a double reception of special parity bytes, falls below a prescribed level.

3. The method according to claim 1, wherein a number of parity errors are calculated in the acquisition of the error signal; and wherein the number of parity errors derived from the error signal is added to the number of parity errors contained in the received error message byte in the derivation of the new error message byte.

4. The method according to claim 1, wherein a parity error pattern is formed in the acquisition of the error signal per transport module; and wherein at the at least one intermediate link location a locally formed parity error pattern and a received parity error pattern in the received error message byte are respectively combined bit-by-bit in the derivation of the new error message byte, being combined by an exclusive OR-function.

5. An apparatus for quality monitoring of at least two series connected line sections of a digital signal transmission link having transmission equipment operating according to a synchronous hierarchy, wherein digital signals are transmitted in virtual containers of synchronous transport modules and section overheads of synchronous transport modules and having module parity bytes and a special parity byte in a path overhead of each virtual container, comprising: at each end of each digital signal line section line terminal equipment having synchronous multiplexers and monitoring circuits and in each digital signal line section intermediate line section locations having synchronous regenerators and monitoring circuits; and at least one intermediate link location of the transmission link, at which an end of one line section is connected to a start of a following line section, having a means for locally generating comparison signals form the digital signals received at the intermediate link location, a means for comparing received parity bytes, received at the intermediate link location from a start of the one line section, to the locally generated comparison signals, and a means for deriving error message signals from the comparison of the received parity bytes and the comparison signals, the error message signals being transmitted on lines that carry the digital signals between synchronous line multiplexers of the at least one intermediate link location.

6. A method for quality monitoring of at least tow series connected line sections of a digital signal transmission link having transmission equipment operating according to a synchronous hierarchy, wherein digital signals are transmitted in virtual.containers of synchronous transport modules and section overheads of synchronous transport modules and having module parity bytes and a special parity byte in a path overhead of each virtual container, and for each line section module parity bytes derived from digital signals received at an end of the respective line section being compared to received module parity bytes received at a start of the respective line section and an error signal being formed in a prescribe dependency on a result of the comparison, comprising the steps of:

deriving an error message byte, in at least one intermediate link location of the transmission link, at which one end of one line section is connected to a start of a following line section, from the error signal and transmitting the error message byte over the following line section as the special parity byte, and the error message byte being transmitted on lines that carry the digital signals between synchronous line multiplexers of the at least one intermediate link location;

deriving in the following line section, a new error message byte from the error message byte received from the one line section and an error signal formed at the end of the following line section;

repeating the steps of forming an error message byte to produce a sequence of error message bytes of the transmission link and acquiring a quality criterion for the monitored transmission link by evaluating the sequence of error message bytes, a number of parity errors being calculated in the acquisition of the error signal and the number of parity errors derived from the error signal being added to the number of parity errors contained in the received error message byte in he derivation of the new error message byte; and forming a parity error pattern in the acquisition of the error signal per transport module, a locally formed parity error pattern and a received parity error pattern in the received error message byte being respectively combined bit-by-bit by an exclusive OR-function in the derivation of the error message byte.

7. The method according to claim 6, wherein a plurality of successive error message bytes in the sequence of error message bytes is evaluated and wherein a change of a result of the evaluation, produced by one of a loss and a double reception of special parity bytes, falls below a prescribed level.

* * * * *